United States Patent
Brogan et al.

(10) Patent No.: US 9,590,452 B2
(45) Date of Patent: Mar. 7, 2017

(54) POWER SUPPLY ARRANGEMENT OF A WIND FARM

(71) Applicant: Siemens Aktiengesellschaft, Munich (DE)

(72) Inventors: Paul Brian Brogan, Glasgow (GB); Jesper Moeller, Esbjerg (DK); Jan Thisted, Tjele (DK)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 50 days.

(21) Appl. No.: 14/582,604

(22) Filed: Dec. 24, 2014

(65) Prior Publication Data
US 2015/0263569 A1  Sep. 17, 2015

(30) Foreign Application Priority Data
Mar. 14, 2014 (EP) ................. 14159910

(51) Int. Cl.
*H02J 11/00* (2006.01)
*H02J 3/38* (2006.01)
(Continued)

(52) U.S. Cl.
CPC ............ *H02J 11/00* (2013.01); *F03D 7/00* (2013.01); *F03D 7/026* (2013.01); *F03D 9/005* (2013.01);
(Continued)

(58) Field of Classification Search
CPC . Y02E 10/723; Y02E 10/725; H02P 2009/004
(Continued)

(56) References Cited

U.S. PATENT DOCUMENTS

| 7,141,887 B2 * | 11/2006 | Okubo ................ F03D 9/003 290/44 |
| 7,394,166 B2 * | 7/2008 | Teichmann ............ H02J 3/38 290/44 |

(Continued)

FOREIGN PATENT DOCUMENTS

| EP | 2565443 A1 | 3/2013 |
| EP | 2667498 A2 | 11/2013 |
| WO | 2014032668 A1 | 3/2014 |

OTHER PUBLICATIONS

Bahrman M. et al; "The New Black Start: System Restoration with Help from Voltage-Sourced Converters"; IEEE Power and Energy Magazine, IEEE, Piscataway, NJ; vol. 12; No. 1; pp. 44-53; ISSN: 1540-7977; DOI: 10.1109/MPE.2013.2285592; XP011534644; 2014; US; Jan. 1, 2014.

*Primary Examiner* — Tulsidas C Patel
*Assistant Examiner* — Charles Reid, Jr.
(74) *Attorney, Agent, or Firm* — Beusse Wolter Sanks & Maire

(57) ABSTRACT

A power supply arrangement adapted to provide auxiliary power to a wind farm that feeds into a HVDC transmission link is provided. The power supply arrangement has an auxiliary power supply to deliver auxiliary power ($P_{aux}$) to the wind farm; a backfeed control for initiating provision of a backfeed voltage on the HVDC link during a wind farm downtime; a backfeed switch to close a DC current path between the HVDC link and the auxiliary power supply; and a power converter for converting the backfeed voltage into auxiliary power ($P_{aux}$). A wind farm arranged to feed into a HVDC transmission link is also provided, having such a power supply arrangement for providing auxiliary power ($P_{aux}$) to the wind farm during a wind farm downtime. A method of providing auxiliary power ($P_{backfeed}$) to a wind farm during a wind farm downtime is also provided.

15 Claims, 2 Drawing Sheets

(51) Int. Cl.
*H02J 3/36* (2006.01)
*H02J 9/00* (2006.01)
*F03D 7/02* (2006.01)
*F03D 7/00* (2006.01)
*F03D 9/00* (2016.01)

(52) U.S. Cl.
CPC .................. *H02J 3/36* (2013.01); *H02J 3/386* (2013.01); *H02J 9/00* (2013.01); *Y02E 10/723* (2013.01); *Y02E 10/763* (2013.01); *Y10T 307/62* (2015.04)

(58) Field of Classification Search
USPC ............................ 290/44, 55; 363/35; 307/65
See application file for complete search history.

(56) References Cited

U.S. PATENT DOCUMENTS

| | | | | |
|---|---|---|---|---|
| 8,324,751 | B2* | 12/2012 | Yasugi | F03D 7/042 290/44 |
| 2003/0168864 | A1* | 9/2003 | Heronemus | F03D 9/00 290/55 |
| 2004/0145188 | A1* | 7/2004 | Janssen | F03D 7/0224 290/44 |
| 2008/0030027 | A1* | 2/2008 | Erdman | F03D 7/0224 290/40 R |
| 2008/0069692 | A1* | 3/2008 | Oohara | F03D 7/0224 416/31 |
| 2011/0140511 | A1 | 6/2011 | Larsen | |
| 2011/0175355 | A1* | 7/2011 | Rosenvard | F03D 7/048 290/44 |
| 2011/0285136 | A1* | 11/2011 | Desmeules | F03B 17/061 290/54 |
| 2012/0144828 | A1* | 6/2012 | Lazaris | H02J 3/383 60/641.1 |
| 2012/0146423 | A1* | 6/2012 | Bodewes | F03D 9/005 307/84 |
| 2012/0150361 | A1* | 6/2012 | Lazaris | H02J 3/382 700/297 |
| 2013/0184884 | A1* | 7/2013 | More | F03D 7/0284 700/291 |
| 2013/0213038 | A1* | 8/2013 | Lazaris | G06Q 30/0605 60/641.8 |
| 2014/0346774 | A1* | 11/2014 | Cooper | F03D 7/02 290/44 |

* cited by examiner

POWER SUPPLY ARRANGEMENT OF A WIND FARM

CROSS REFERENCE TO RELATED APPLICATIONS

This application claims the benefit of European Application No. EP14159910 filed Mar. 14, 2014, incorporated by reference herein in its entirety.

FIELD OF INVENTION

The invention describes a power supply arrangement of a wind farm for delivering auxiliary power to the wind farm; a wind farm; and a method of providing auxiliary power to a wind farm.

BACKGROUND OF INVENTION

An offshore wind farm or wind park generally comprises a plurality of wind turbines that generate electricity. In order to transport the electricity to a utility grid, the electricity is first fed into an offshore substation for conversion to a suitable current/voltage level and then transported by cable to an onshore substation, where the electricity may undergo further voltage/current conversion before being fed into a grid. Electricity can be transported as alternating current (AC), but AC transport is generally associated with losses, particularly over long distances. Since the trend is to more offshore wind farms with increasing capacity, the electricity from such wind farms is preferably transported over a high-voltage direct current (HVDC) transmission link, generally by a subsea cable laid on the seabed. To this end, the three-phase AC electricity from the wind turbines is converted by an offshore converter at the offshore substation into high-voltage DC electricity for transport.

For various reasons, wind turbines of a wind farm may need to be shut down for some time, after which they must be started up again. To be able to re-start a wind turbine after a wind farm downtime, an external power source is necessary to keep various systems and components supplied with power during a downtime. For example, various motors and drives of the wind turbines need to be periodically re-started for brief intervals during the downtime (to prevent the various bearings from seizing, for instance). This can be achieved by realising the offshore AC/DC converter as a bi-directional power converter, so that some auxiliary power could be fed from the onshore converter (which is generally realised as a full bridge converter) back to the wind park over the HVDC transmission line. However, such a bi-directional offshore power converter is expensive and adds considerably to the cost of the wind park. As an alternative, the offshore converter can be realised as a one-directional converter, and an additional AC link may be laid parallel to the HVDC link, so that auxiliary power can be provided to the windfarm whenever necessary. Clearly, such an additional transmission link also adds considerably to the overall cost of the windfarm. Since future HVDC-connected wind farms will often be located 100-200 km from the shore, such an additional AC subsea cable connection presents a severe challenge economically as well as technically.

SUMMARY OF INVENTION

It is therefore an object of the invention to provide a more economical way of providing auxiliary power to the wind turbines of an offshore wind farm.

This object is achieved by a power supply arrangement; by a wind farm; and by a method of providing auxiliary power to a wind farm as claimed.

According to aspects of the invention, the power supply arrangement of a wind farm—that is realised to feed into a HVDC transmission link—comprises an auxiliary power supply realised to deliver auxiliary power to the wind farm; a backfeed control for initiating provision of a backfeed voltage on the HVDC link during a wind farm downtime; a backfeed switch realised to close a DC current path between the HVDC link and the auxiliary power supply; and a power converter for converting the backfeed voltage to auxiliary power for the wind farm.

During normal operation of a wind farm, 'auxiliary' power that is required for auxiliaries such as cooling systems, controllers, etc. is covered by the power produced by the wind turbines, i.e. a (relatively small) fraction of the power generated by the wind turbines is used to power the auxiliaries. Furthermore, some of the power produced by the wind turbines is also used to maintain a level of charge in the batteries of the auxiliary power supply. In the context of the invention, the terms "power supply arrangement" and "auxiliary power supply arrangement" may be regarded as equivalent terms and may be used interchangeably. The same applies to the terms "power supply" and "auxiliary power supply".

In the following, without restricting the invention in any way, it may be assumed that the wind farm is located at a remote location such as an offshore location. The auxiliary power supply according to the invention is particularly well suited to providing auxiliary AC power to a wind farm at a location that is too remote for an affordable backup AC transmission link, as explained in the introduction. It may also be assumed that the auxiliary power supply is connected to the wind farm by a supply line such as a high-voltage busbar, and that the auxiliary power supply has a transformer and a bi-directional converter for converting between wind farm AC power and battery DC power.

It may also be assumed that the wind farm comprises an offshore AC/DC converter for converting AC power generated by the wind farm into high-voltage DC for transport over the HVDC transmission link. The power supply according to the invention can very favourably provide a way of ensuring a backup or auxiliary power supply originating from an onshore power source, even if the offshore converter is based on an arrangement of passive rectifiers that transfer power in one direction only.

As indicated above, in normal 'uptime' operation of the wind farm, power is transported from the wind farm over the HVDC link to the utility grid. The invention is based on the insight that an onshore substation with the usual full-bridge converter design is capable of transforming power in both directions, i.e. from the HVDC link into the utility grid; and from the utility grid onto the HVDC link.

In the context of the invention, a 'backfeed voltage' is a voltage level applied to the HVDC link, for example by a converter of an onshore substation, during a downtime of the wind farm. Therefore, during a wind farm downtime, the onshore converter can supply the wind farm with auxiliary power via the HVDC link and the auxiliary power supply. The auxiliary power supply already avails of a bidirectional power converter module, so that it can also convert the backfeed DC power to an AC power suitable for transport to the wind farm.

An advantage of the auxiliary power supply arrangement according to aspects of the invention is that the auxiliary power supply can be supplemented as necessary by a DC voltage originating from the utility grid. Therefore, during and immediately following a wind farm downtime, sufficient power is always available to maintain backup power to the wind turbines and to re-start the wind turbines. A re-start of the wind farm is therefore favourably independent of the level of charge of the batteries of an auxiliary power supply, and the wind farm can resume outputting its rated power more quickly.

According to aspects of the invention, a wind farm arranged to feed into a HVDC transmission link comprises a power supply arrangement according to the invention for providing auxiliary power to the wind farm in response to a wind farm downtime.

An advantage of such a wind park is that a backup or auxiliary power supply is always available during a downtime, so that its wind turbines can be re-started quickly after such a wind farm downtime, and the power output of the wind farm can quickly return to its rated level.

According to aspects of the invention, a method of providing auxiliary power to a wind farm realised to feed into a HVDC transmission link comprises the steps of providing an auxiliary power supply realised to provide auxiliary power to the wind farm; initiating provision of a backfeed voltage on the HVDC link during a wind farm downtime; closing a DC current path between the HVDC link and the auxiliary power supply; and converting the backfeed voltage to auxiliary power for the wind farm.

An advantage of the method is that it provides a straightforward and relatively economical way of providing auxiliary power to a wind farm during a downtime and for as long as it takes for the wind turbines to be re-started after a downtime. The method can be used in conjunction with existing onshore facilities, since it is relatively easy to control a full-bridge converter of an onshore substation to apply a suitable backfeed voltage to a HVDC link. Therefore, the method according to aspects of the invention can provide an efficient response when a wind farm needs auxiliary power.

Particularly advantageous embodiments and features of the invention are given by the dependent claims, as revealed in the following description. Features of different claim categories may be combined as appropriate to give further embodiments not described herein.

As mentioned above, when the wind farm is operational, it is possible to 'divert' some power and use it to maintain charge in the batteries of an auxiliary power supply. For example, if the wind farm is able to generate more power than its rated output, this superfluous power can be used to charge an energy storage module of an auxiliary power supply for later use. To this end, in an embodiment of the invention, the auxiliary power supply comprises an AC battery charger realised to charge the batteries of the battery arrangement during an uptime of the wind farm. To be able to use this 'stored' energy at a later time, the AC charger is realised as a bi-directional power converter/inverter so that power can be transported from the wind farm supply line to the auxiliary power supply (for charging the batteries), and also from the auxiliary power supply to the wind park (for supplying auxiliary power during downtime and restarting the wind turbines after downtime). Advantageously, the power converter of the auxiliary power supply arrangement is realised to provide voltage magnitude control as a static VAr compensator (SVC). In such an embodiment, the auxiliary power supply can be used to help control the offshore AC voltage, i.e. the windfarm busbar voltage, together with any wind turbines operating in such a mode. In a further embodiment, the auxiliary power supply provides phase angle control.

Advantageously, the backfeed control is realised to respond to a wind farm auxiliary power request. For example, a wind farm controller can monitor the wind turbines' downtime-related power requirements and may be responsible for initiating a re-start procedure after a downtime. This wind farm controller may also be in contact with a controller of the auxiliary power supply. Therefore, the wind farm controller may assess the level of available auxiliary power, and may 'order' additional backfeed power from the onshore converter as required. In the context of the invention, the term 'wind farm backfeed power request' may be understood to mean any request or command that indicates that additional backfeed power is required. Such a command or request may also indicate how much power is required and for how long. Advantageously, opening or closing of the backfeed power path is controlled by the wind park controller. For example, the controller may take any necessary steps to ensure that the battery bank is maintained and charged when DC backfeed power is available.

The onshore converter may respond to a wind farm downtime by automatically applying a backfeed voltage to the HVDC link. For example, when the wind farm ceases to deliver power, this can be detected by or can be reported to the onshore converter, which can then automatically respond by applying a suitable backfeed voltage level that can be used as required by the auxiliary power supply. In an embodiment of the invention, the backfeed control is realised as a module of a HVDC link controller of the onshore substation, and can communicate with a wind farm controller over any appropriate communication channel, for example by a wireless or internet connection.

In an embodiment of the invention, the backfeed switch is realised to be actuated on the basis of a voltage level of the HVDC link and/or by the wind farm controller, as described above. The method according to the invention advantageously comprises a step of monitoring a voltage level on the HVDC link. For example, the backfeed switch can close automatically if the HVDC link voltage level lies within a certain range during a wind farm downtime. This voltage level will be significantly lower than the voltage level present on the HVDC link during normal operation of the wind farm. As long as the backfeed switch is closed, current can flow from the HVDC link into the auxiliary power supply to charge the batteries and/or to be converted into a power level suitable for the wind farm busbar. The backfeed switch can be implemented using conventional isolators etc. to ensure that a smooth connection is achieved when the backfeed switch is closed. Advantageously, the backfeed control is realised to ensure that the very high DC voltage (when the wind park is delivering power to the grid) cannot be connected to the auxiliary power supply. For example, in an embodiment of the invention, the backfeed control may be realised to ensure that the backfeed switch can only be closed when the HVDC voltage does not exceed a certain level. Control of the backfeed switch may be performed on the basis of the voltage level on the HVDC link. Advantageously, the full-bridge converter of the onshore substation is controlled to prevent the voltage level on the HVDC transmission link from exceeding a certain level when the backfeed switch is closed. To this end, an interlock system can be implemented at the onshore substation. In this way, components of the auxiliary power supply can be effectively protected from overvoltage damage.

The backfeed voltage can be generated at any suitable level. For example, in an embodiment of the invention, the backfeed voltage is generated according to the monitored voltage level of the auxiliary power supply. In such a realisation, the onshore converter delivers power at a voltage level suitable to cover the deficit of the auxiliary power supply. In a further embodiment of the invention, the backfeed voltage is generated according to a predefined level, which can be defined according to the capacity of the battery bank of the auxiliary voltage supply. The current drawn by the auxiliary power supply may depend on the level of charge in the batteries, or on a momentary auxiliary power requirement of the wind farm. For example, the onshore converter may deliver a sufficiently high backfeed voltage for a backfeed power high enough to re-start some or all of the wind turbines via the auxiliary power supply. In an embodiment of the invention, the auxiliary power supply comprises a DC/DC voltage converter for converting the backfeed HVDC voltage to a voltage level suitable for charging batteries of the battery arrangement. Such a constant voltage level ensures that the batteries are charged in a favourable manner. Advantageously, the DC/DC voltage converter is realised to convert a backfeed HVDC voltage in the range of e.g. 20 kV to a voltage suitable for the battery arrangement. The backfeed voltage level is as low as possible, while being sufficiently high in the light of various factors such as the momentary active power requirements of the wind turbines, the current rating of the full-bridge converter of the onshore substation, etc. Advantageously, the back feed power supply is sufficient to cover the average power consumption of the wind park (during the downtime) and to maintain a charging of the batteries. Peak power requirements of the wind park (for example to restart some turbines after the downtime) can then be covered by the backfeed power supply (i.e. from the DC charger of the auxiliary power supply) together with power from the charged batteries of the auxiliary power supply.

As mentioned above, when the wind farm is operational, it is possible to 'divert' some power and use it to re-charge the batteries of the auxiliary power supply. For example, if the wind farm is able to generate more power than its rated output, this superfluous power can be converted to a DC charge for later use. To this end, in an embodiment of the invention, the auxiliary power supply comprises an AC battery charger realised to charge the batteries of the battery arrangement during an uptime of the wind farm. To be able to use this 'stored' power at a later time, the AC charger is realised as a bi-directional DC/AC power converter so that power can be transported from the wind farm supply line to the auxiliary power supply (for charging the batteries), and also from the auxiliary power supply to the wind farm's AC supply line (for supplying auxiliary power and for restarting the wind turbines). Advantageously, the bidirectional power converter of the auxiliary power supply arrangement is realised to provide voltage magnitude control as a static VAr compensator (SVC). In such an embodiment, the auxiliary power supply can be used to help control the offshore AC voltage, i.e. the windfarm busbar voltage, together with any wind turbines operating in such a mode.

The HVDC transmission link can be connected to the backfeed power supply arrangement in any suitable way. In an embodiment of the invention, the backfeed power supply arrangement is connected to the HVDC transmission link by a DC connection box.

Other objects and features of the present invention will become apparent from the following detailed descriptions considered in conjunction with the accompanying drawings.

It is to be understood, however, that the drawings are designed solely for the purposes of illustration and not as a definition of the limits of the invention.

BRIEF DESCRIPTION OF THE DRAWINGS

In the diagrams, like numbers refer to like objects throughout. Objects in the diagrams are not necessarily drawn to scale.

DETAILED DESCRIPTION OF INVENTION

Figure 1:
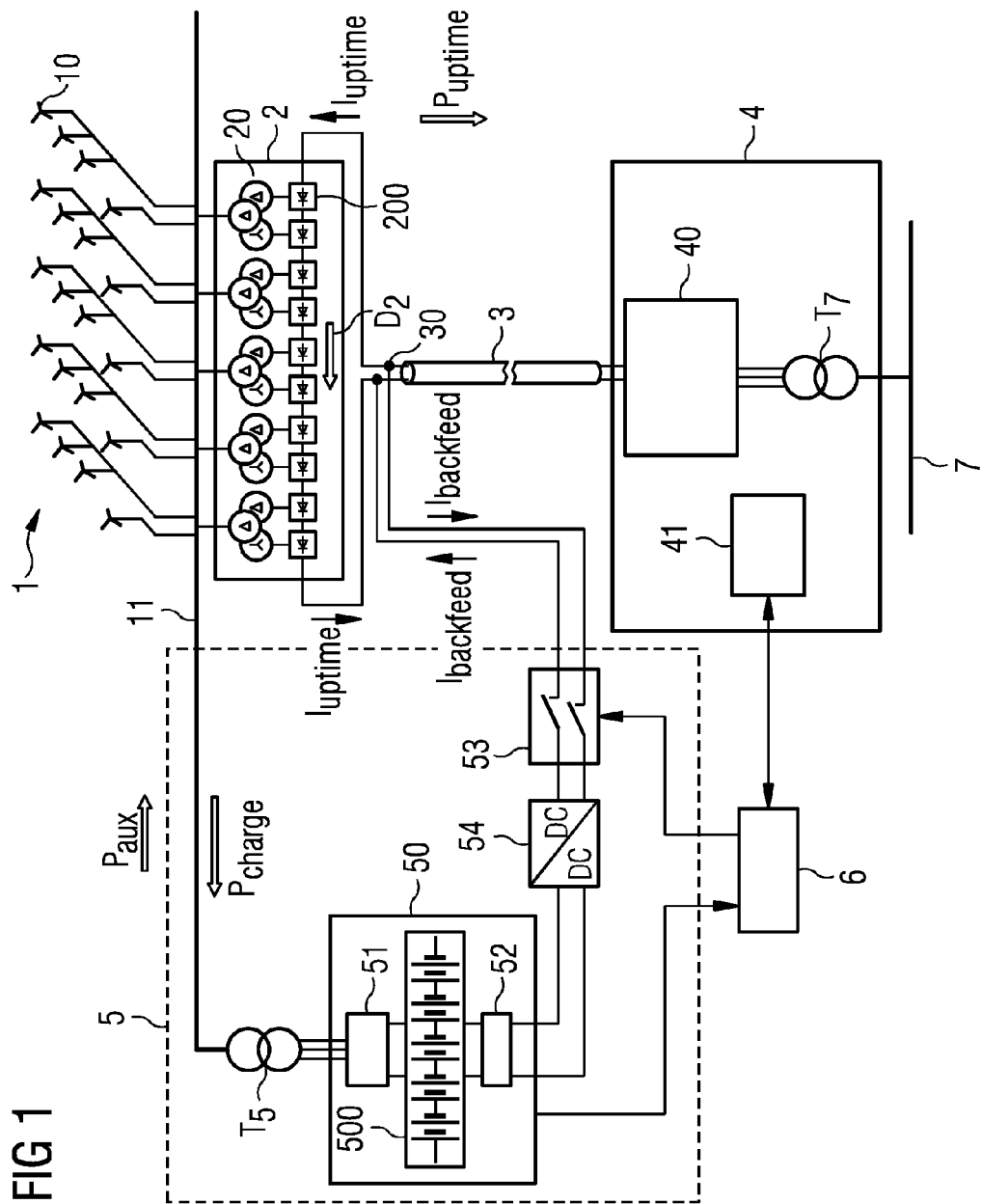
FIG. 1 is a schematic representation of a wind farm comprising a power supply arrangement according to an embodiment of the invention.

FIG. 1 is a schematic representation of a wind farm 1 comprising an auxiliary power supply arrangement 5 according to an embodiment of the invention. Here, the wind farm 1 is an offshore wind farm 1 comprising a plurality of wind turbines 10 that generate three-phase AC electricity. The AC power output from the wind turbines 10 is transformed by passive rectifiers 200 of an AC/DC converter 20 of an offshore substation 2 into DC power for transport over a HVDC transmission link 3 to an onshore substation 4. In this embodiment, the AC/DC converter 20 of the offshore substation 2 allows current flow in one direction $D_2$ only. DC current $I_{uptime}$ flows in a closed loop from the onshore substation 4 through the offshore substation 2 and back to the onshore substation 4. Conversion from DC back to AC is performed by a full-bridge converter 40 of the onshore substation 4 so that the power $P_{uptime}$ can be fed into a utility grid 7. The offshore components (e.g., wind farm 1, offshore substation 2) are spatially separate from the onshore components (e.g., onshore substation 4), and the HVDC transmission link 3 can cover a distance of tens or even hundreds of kilometers.

When the wind farm 1 is operational, it delivers power $P_{uptime}$ to the grid 7 over the HVDC transmission link 3. Auxiliaries of the wind turbines 10, such as cooling systems, drives, etc., are supplied with power $P_{aux}$ from an auxiliary power supply 50. Auxiliary power is supplied by an auxiliary power supply 50 and is converted by the transformer $T_5$ into AC power at a level suitable for transport over the wind farm's busbar 11 or supply line.

During normal uptime operation of the wind farm 1, a portion $P_{charge}$ of the power output by the wind turbines 10 can also be used to charge the batteries 500 of the auxiliary power supply 50. To this end, the AC power $P_{charge}$ from the busbar 11 is transformed to a suitable level by a transformer $T_5$ so that the batteries 500 can be charged by a converter module 51 or auxiliary power converter 51 realised as a bi-directional charger and inverter. During a wind farm uptime, a switch 53 between HVDC link and the auxiliary power supply 50 is open, and power $P_{charge}$ only enters the auxiliary power supply 50 from the busbar 11 in order to charge the batteries 500 using the auxiliary power converter 51.

At some stage, the wind farm 1 may be shut down, for example during a maintenance procedure or because of calm weather with little or no wind. The terms 'shut down' and 'downtime' are to be understood to mean that the wind turbines 10 do not feed power into the grid during that time.

During a downtime, the generators of the wind turbines 10 are deactivated and electrically disconnected from the offshore substation 2 (the switches are not shown in FIG. 1 for the sake of clarity but it may be assumed that all connections are interrupted between wind turbines, busbar etc. and offshore substation). However, during the downtime, some auxiliary power is necessary to keep the wind turbine transformers energized, so that auxiliary power can be supplied to the communications systems, yaw systems, pitch systems, environment control modules, etc. of the wind turbines, and so that the wind turbine is kept in a state of readiness.

However, the power supplied from the available battery charge in the auxiliary power supply 50 may not be sufficient to provide auxiliary power for a longer period to all the wind turbines that were shut down. In this exemplary embodiment, a module 6 of a park controller (not shown) monitors the power requirement of the wind farm 1 and communicates with a module 41 of the onshore substation 4 to trigger or initiate provision of a backfeed voltage. A wind farm 1 is generally controlled by a park controller that is realised to issue control commands to various components such as individual wind turbines 10, a controller of the auxiliary power supply arrangement 5, etc. These components can also provide status information to the park controller. For example, the auxiliary power supply arrangement 5 may inform a module 6 of the park controller that the power level in the batteries 500 is or may be insufficient. The park controller (not shown) can be located at the offshore location as well, but can equally be located onshore. Communication between the park controller and the components (e.g., wind turbines 10, auxiliary power supply arrangement 5) it controls, or the facilities (e.g., module 41) with which it communicates, can be over any suitable communication channels such as wireless connections.

In this embodiment, the utility grid 7 can provide the necessary power required to provide some auxiliary power to the wind turbines 10. To this end, in response to a suitable command as described above, the converter 40 of the onshore substation 4 applies a backfeed voltage to the HVDC transmission line 3. For example, a backfeed voltage of about 10 kV-20 kV can be enough to maintain a supply of auxiliary power to a wind farm 1 and/or to restart a number of the wind turbines 10 simultaneously or consecutively after a downtime. The switch 53 is closed to electrically connect the HVDC transmission line 3 to the auxiliary power supply arrangement 5. The switch 53 can be closed in response to a command from a module 6 of the park controller. A DC circuit path from a tap 30 on the HVDC transmission link 3 to the auxiliary power supply 50 is then complete, so that DC current $I_{backfeed}$ can flow along the path indicated by the arrows. The auxiliary power supply 50 in this embodiment also comprises a DC/DC converter 54 for converting the backfeed voltage to a level suitable for a DC charger 52 which can charge the batteries 500. Of course, the backfeed power supplied in this manner can be fed essentially directly to the transformer $T_5$ for conversion to AC power for the busbar 11, so that the backfeed power is directly available as auxiliary power to the wind farm 1, since the batteries 500 are connected across the DC link of the power converter 51. Therefore, power can be transferred from the power converter 51 into the offshore AC system via busbar 11, via the transformer $T_5$, from the batteries 500 or from the DC/DC converter 54. The batteries 500 are connected in parallel to the DC link of the backfeed converter, so power does not flow through the batteries as such. The auxiliary power converter 51 (or inverter 51) converts DC current drawn from the batteries 500 into AC current and voltage. The transformer $T_5$ converts or transforms the DC voltage into an AC voltage level suitable for the wind farm's busbar 11.

In one possible scenario, the backfeed power supplied via the auxiliary power supply may be used to restart one or more wind turbines. As soon as one wind turbine is restarted, this wind turbine can feed AC power into the wind farm supply line, thereby providing power needed to start up the remaining wind turbines. As soon as all wind turbines resume production, the backfeed switch is opened again so that the HVDC transmission link can be powered up to normal operating voltage, allowing active power to be transferred again from the wind turbines to the utility grid.

Figure 2:
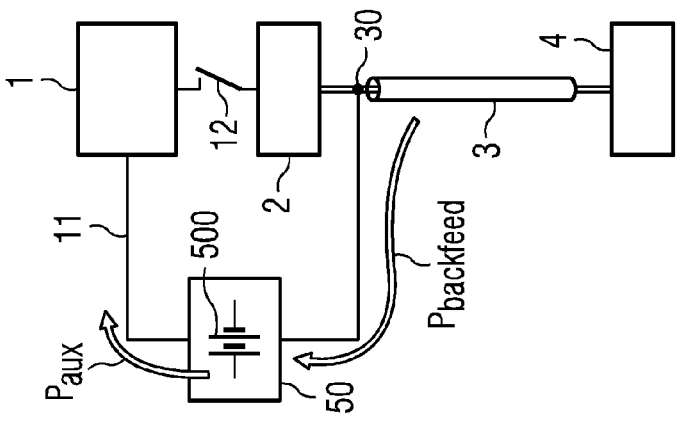
FIG. 2 shows the wind farm of FIG. 1 in an uptime state.

FIG. 2 is a simplified block diagram showing the normal transfer of power $P_{uptime}$ to the grid 7 over the HVDC transmission link 3 when the wind farm 1 is operational. As described above, a portion $P_{charge}$ of the power output by the wind turbines 10 is used to charge the batteries 500 of the auxiliary power supply 50.

Figure 3:
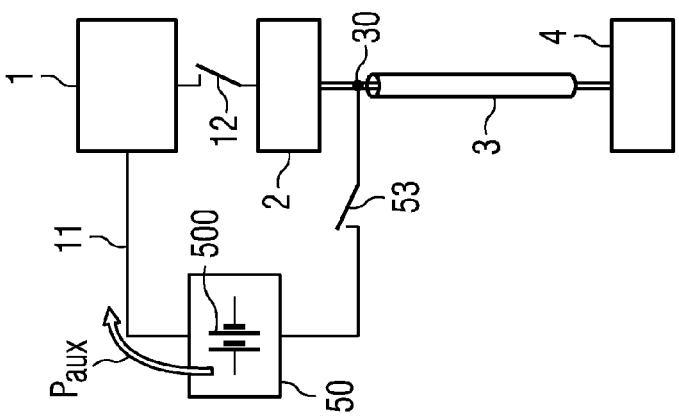
FIG. 3 shows the wind farm of FIG. 1 in a first downtime state.

During a downtime, the generators of the wind turbines are deactivated and electrically disconnected from the offshore substation 2. This is indicated collectively by the 'open switch' between the wind farm 1 and the offshore substation 2 in FIG. 3. To supply auxiliary power during a downtime and/or to restart one or more wind turbines after a downtime, auxiliary power $P_{aux}$ is provided from the batteries 500 of the auxiliary power supply 50 over the busbar 11 to the wind farm 10.

Figure 4:
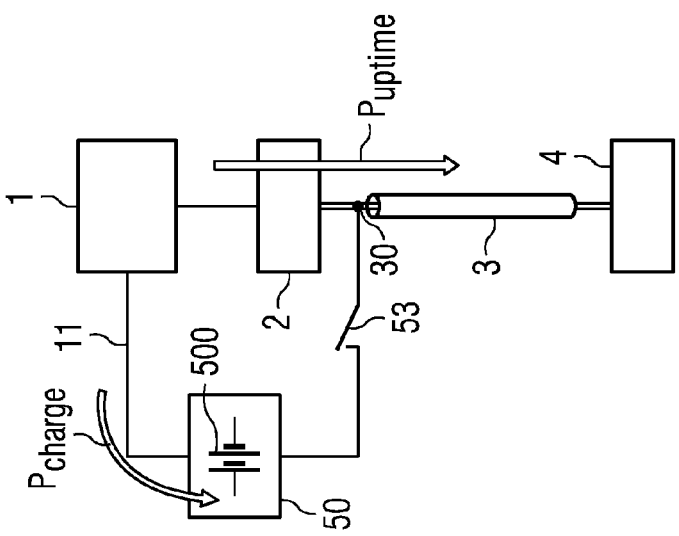
FIG. 4 shows the wind farm of FIG. 1 in a second downtime state.

As indicated above, the auxiliary power $P_{aux}$ supplied from the available battery charge may not be sufficient. FIG. 4 illustrates an additional backfeed power transfer in which the switch 53 is closed so that a backfeed voltage is supplied by the utility grid 7, via the onshore full bridge converter 40. As a result, additional backfeed power $P_{backfeed}$ can flow in the direction indicated in FIG. 4 from the HVDC link 3 to the auxiliary power supply arrangement 5. The backfeed power $P_{backfeed}$ can be used to charge the batteries 500 and/or may be used 'directly', so that auxiliary power $P_{aux}$ is drawn from the backfeed power $P_{backfeed}$. Equally, the backfeed power $P_{backfeed}$ can supplement the power available in the batteries so that enough auxiliary power $P_{aux}$ is available, for example to restart the wind farm 1 quickly after downtime. Once the wind turbines are operational, the switch 12 between wind farm 1 and offshore substation 2 is closed, and the backfeed isolator switch 53 is opened again, so that the wind farm 1 can once more feed into the utility grid 7 in the arrangement of FIG. 1.

Although the present invention has been disclosed in the form of preferred embodiments and variations thereon, it will be understood that numerous additional modifications and variations could be made thereto without departing from the scope of the invention. For example, the backfeed power supply arrangement according to the invention could also be used in a HVDC transmission system with an offshore converter that supports bi-directional power transfer.

For the sake of clarity, it is to be understood that the use of "a" or "an" throughout this application does not exclude a plurality, and "comprising" does not exclude other steps or elements. The mention of a "unit" or a "module" does not preclude the use of more than one unit or module.

The invention claimed is:

1. A power supply arrangement to provide auxiliary power to a wind farm that feeds into a high-voltage direct current (HVDC) transmission link for delivery to a utility grid, which the power supply arrangement comprises:

an auxiliary power supply which receives a portion of power from the wind farm, stores the portion of the power and delivers auxiliary power ($P_{aux}$) to the wind farm during wind farm downtime;

a backfeed controller for initiating provision of a backfeed voltage on the HVDC link during the wind farm downtime;

a backfeed switch to close a DC current path between the HVDC link and the auxiliary power supply to deliver the backfeed voltage from the utility grid to the auxiliary power supply; and a power converter for converting the backfeed voltage into the auxiliary power ($P_{aux}$).

2. A power supply arrangement according to claim 1, wherein the backfeed controller responds to a wind farm auxiliary power requirement.

3. A power supply arrangement according to claim 1, wherein the backfeed controller actuates the backfeed switch on the basis of a voltage level of a battery arrangement of the auxiliary power supply.

4. A power supply arrangement according to claim 1, further comprising:

a DC/DC voltage converter for converting the backfeed voltage to a voltage suitable for the auxiliary power supply.

5. A power supply arrangement according to claim 4, wherein the DC/DC voltage converter is adapted to convert the backfeed voltage in the range of 20 kV to a voltage suitable for a DC battery charger of a battery arrangement of the auxiliary power supply.

6. A power supply arrangement according to claim 1, further comprising:

an alternating current (AC) battery charger adapted to charge batteries of a battery arrangement of the auxiliary power supply during an uptime of the wind farm.

7. A power supply arrangement according to claim 1, wherein the auxiliary power supply provides a phase angle control.

8. A power supply arrangement according to claim 1, wherein the HVDC transmission link is connected to the auxiliary power supply by a DC connection tap.

9. A power supply arrangement according to claim 1, wherein the backfeed controller comprises a module of a park controller and/or a module of a HVDC link controller.

10. A wind farm arranged to feed into a high-voltage direct current (HVDC) transmission link, comprising a power supply arrangement according to claim 1 for providing auxiliary power ($P_{aux}$) to the wind farm during a wind farm downtime.

11. A wind farm according to claim 10, wherein the wind farm is installed at an offshore location and wherein the power supply arrangement is installed at the wind farm.

12. A wind farm according to claim 11, further comprising an offshore converter for converting alternating current (AC) power generated by the wind farm into a high-voltage DC for transport over the HVDC transmission link, which the offshore converter transports power in one direction only.

13. A method of providing auxiliary power to a wind farm during a wind farm downtime, which the wind farm feeds into a high-voltage direct current (HVDC) transmission link to a utility grid, comprising:

providing an auxiliary power supply which receives a portion of power from the wind farm, stores the portion of the power and delivers the auxiliary power to the wind farm;

initiating provision of a backfeed voltage on the HVDC link from the utility grid during a wind farm downtime via a controller;

closing a DC current path between the HVDC link and the auxiliary power supply via the controller to deliver the backfeed voltage from the utility grid to the auxiliary power supply; and converting the backfeed voltage to the auxiliary power for the wind farm.

14. A method according to claim 13, further comprising monitoring, by a module of the controller, a voltage level of a battery arrangement of the auxiliary power supply, wherein provision of the backfeed voltage is initiated if an auxiliary power supply voltage level is insufficient for auxiliary power needs of the wind farm.

15. A method according to claim 13, wherein the DC current path between the HVDC link and the auxiliary power supply is closed in response to the backfeed voltage on the HVDC link.

* * * * *